(12) United States Patent
Sakamoto et al.

(10) Patent No.: US 10,886,558 B2
(45) Date of Patent: Jan. 5, 2021

(54) BATTERY MODULE

(71) Applicant: TOYOTA JIDOSHA KABUSHIKI KAISHA, Toyota (JP)

(72) Inventors: Takuma Sakamoto, Toyota (JP); Satomi Yamamoto, Miyoshi (JP); Koichi Tanimoto, Nissin (JP); Shinya Omura, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 16/250,057

(22) Filed: Jan. 17, 2019

(65) Prior Publication Data

US 2019/0229364 A1 Jul. 25, 2019

(30) Foreign Application Priority Data

Jan. 19, 2018 (JP) .................................. 2018-007552

(51) Int. Cl.
*H01M 2/10* (2006.01)
*H01M 10/04* (2006.01)

(52) U.S. Cl.
CPC ..... *H01M 10/0481* (2013.01); *H01M 2/1077* (2013.01); *H01M 2/1094* (2013.01)

(58) Field of Classification Search
None
See application file for complete search history.

(56) References Cited

U.S. PATENT DOCUMENTS

| 5,786,980 A | * | 7/1998 | Evans | H01G 9/08 |
| | | | | 174/17 GF |
| 6,200,698 B1 | * | 3/2001 | Carlstrom, Jr. | H01M 8/247 |
| | | | | 429/465 |
| 6,258,475 B1 | * | 7/2001 | Sugita | H01M 8/247 |
| | | | | 429/470 |
| 9,653,710 B2 | * | 5/2017 | Schumann | H01M 10/0481 |
| 2010/0136461 A1 | | 6/2010 | Tsujiko et al. | |
| 2017/0133705 A1 | * | 5/2017 | Niwa | H01M 2/1077 |
| 2020/0168959 A1 | * | 5/2020 | Hettrich | B60L 50/64 |

FOREIGN PATENT DOCUMENTS

| JP | 2003-045477 A | 2/2003 |
| JP | 2008-277042 A | 11/2008 |

* cited by examiner

*Primary Examiner* — Jonathan Crepeau
(74) *Attorney, Agent, or Firm* — Sughrue Mion, PLLC

(57) ABSTRACT

Provided is a battery module that allows suppressing impairment of battery performance, through suitable control of a restraining pressure that is exerted in the stacking direction of a stack, also in a case where unit cells expand/shrink when charged/discharged. The battery module is provided with a stack in which a plurality of unit cells is stacked, and with a pressure regulation member, which is disposed at least at one site from among a gap between the stacked unit cells, and a first end and a second end in the stacking direction, and which regulates a restraining pressure exerted in the stacking direction of the stack. The pressure regulation member is provided with a liquid holding section and a liquid storage section. The liquid holding section is provided with a liquid holding body capable of holding a liquid. The liquid storage section has a space capable of storing the liquid.

7 Claims, 5 Drawing Sheets

BATTERY MODULE

CROSS-REFERENCE

The present application claims priority to Japanese Patent Application No. 2018-007552 filed on Jan. 19, 2018, and the entire contents thereof are incorporated into the present specification by reference.

BACKGROUND OF THE INVENTION

1. Field of the Invention

The present invention relates to a battery module. More particularly, the present invention relates to a battery module in which a plurality of unit cells is held in a restrained state.

2. Description of the Related Art

Battery modules provided with unit cells such as lithium ion secondary batteries or nickel-hydride batteries have gained in importance as power sources for installation in vehicles that are driven by electricity, and as power sources installed in electric appliances such as personal computers and portable terminals. In particular, battery modules that utilize unit cells in the form of lithium ion secondary batteries that are lightweight and boast high energy density are preferred as high-output power sources for vehicle drive in electric vehicles (EV), plug-in hybrid vehicles (PHV) and hybrid vehicles (HV), and the demand for such batteries is expected to further grow in the future.

In a typical configuration, such battery modules are constructed through stacking of a plurality of unit cells and through restraining of the stack of unit cells in a state in which a predetermined load is applied in the stacking direction. Unit cells are restrained mainly from the viewpoint of vibration resistance and shock resistance of the battery module, and securing battery performance. Examples of prior art documents relating to this art include Japanese Patent Application Publication No. 2008-277042. Japanese Patent Application Publication No. 2008-277042 discloses a battery module provided with an interposed member that can expand in an environment at low temperature (typically +4° C. or lower).

SUMMARY OF THE INVENTION

In battery modules of this kind, the magnitude of the restraining load that is applied to the unit cells at the time of construction of the battery module might vary due to the fact that some of the unit cells expand/shrink during use of the battery (when charged/discharged), and due to deterioration of the battery module over time. Further, the magnitude of the restraining load might vary depending on the usage environment of the battery (for instance air temperature). Accordingly, it has been necessary to regulate the pressure acting on the unit cells in response to changes in the restraining load.

However, control of the restraining pressure in conventional battery modules was insufficient. In particular, it has been necessary to control restraining pressure more satisfactorily in a case where the battery module is constructed using unit cells having a tendency to expand/shrink significantly during battery charging and discharge. For instance sufficient control of restraining pressure is required in a case where expansion of the unit cells progresses as the temperature of the battery module rises. The performance of the battery module may drop unless suitable restraining pressure is applied.

It is an object of the present invention, arrived at in the light of the above considerations, to provide a battery module that allows suppressing impairment of battery performance, through suitable control of the restraining pressure that is exerted in the stacking direction of a stack, also in a case where unit cells expand/shrink when charged/discharged.

The present invention provides a battery module having: a stack in which a plurality of unit cells is stacked; and a pressure regulation member, which is disposed at least at one site from among a gap between the stacked unit cells, and a first end and a second end in the stacking direction, and which regulates a restraining pressure exerted in the stacking direction of the stack.

The unit cell is provided with an exterior body, an electrode body accommodated in the exterior body, and a positive electrode terminal and a negative electrode terminal electrically connected to the electrode body and led out from the exterior body. The pressure regulation member is provided with a liquid holding section and a liquid storage section. The liquid holding section is formed at a position at which the restraining pressure is applied, and includes a liquid and a liquid holding body capable of holding the liquid, wherein the liquid holding body is further capable of reversibly releasing and absorbing the liquid. The liquid storage section is formed at a position at which the restraining pressure is not applied (for instance, a position in the direction along which the positive electrode terminal and the negative electrode terminal are led out from the exterior body). Further, a boundary between the liquid holding section and the liquid storage section is formed so that the liquid can move reversibly therethrough while movement of the liquid holding body towards the liquid storage section is hindered.

If a concern arises that restraining pressure exerted in the stacking direction of the stack may vary on account of expansion of the unit cells during battery charging and discharge, the restraining pressure in the battery module having such a configuration can be regulated, to lie within a suitable range, through movement the liquid from the liquid holding section to the liquid storage section in the pressure regulation member. Conversely, if a concern arises that the restraining pressure exerted in the stacking direction of the stack may vary through shrinkage of the unit cells during use of the battery, the restraining pressure can be regulated to lie in a suitable range through movement of the liquid from the liquid storage section to the liquid holding section in the pressure regulation member. In such a configuration the restraining pressure applied to the stack can be suitably controlled also in a case where the unit cells expand/shrink during use of the battery.

In another preferred implementation of the battery module disclosed herein, the liquid holding body contains a water-absorbing polymer having temperature responsiveness. In such a battery module a liquid is released from the absorbing polymer depending on the temperature, and flows readily towards the liquid storage section, when the unit cells expand as a result of a rise in battery temperature. In a battery module having such a configuration, therefore, the restraining pressure applied to the stack can be suitably controlled in particular in a case where the temperature of the battery module is high (for instance 30° C. or higher).

In another preferred implementation of the battery module disclosed herein, the liquid holding body contains a polymer porous body that deforms elastically on account of the restraining pressure. The liquid holding body can suitably release and absorb a liquid, and accordingly the pressure regulation member provided with the above liquid holding body allows suitably controlling the restraining pressure applied on the stack. The liquid holding body can deform elastically on account of the restraining pressure, and accordingly the restraining pressure can be suitably controlled also by elastic forces arising from elastic deformation.

In another preferred implementation of the battery module disclosed herein, the liquid holding body is held in the liquid holding section in a state in which the liquid holding body is accommodated in a container into and out of which the liquid can reversibly flow. In such a configuration the function of the liquid holding body can be brought out over long periods of time, without collapse of the shape of the liquid holding body.

In another preferred implementation of the battery module disclosed herein, two or more liquid storage sections are formed at positions in mutually different directions with respect to the liquid holding section. In such a configuration, movement of the liquid from the liquid holding section to a plurality of liquid storage sections can be completed within a shorter time. The restraining pressure on the stack by the pressure regulation member can be effectively controlled yet more quickly as a result.

In another preferred implementation of the battery module disclosed herein, the liquid storage section is formed at a region overlapping the positive electrode terminal and/or the negative electrode terminal (hereafter both terminals may be also referred to collectively as "positive and negative electrode terminals") in the stacking direction (that is, when viewed from the stacking direction). In such a configuration the liquid storage section that must be disposed at a position at which the restraining pressure is not applied is set to overlap, in the stacking direction, the position at which there are disposed the positive and negative electrode terminals of the unit cells that make up the stack. As a result, it is not necessary to further provide separately a space for arranging the liquid storage section, different from the space at which there are disposed the positive and negative electrode terminals led out from the exterior body of the unit cells. A large such space is undesirable, since this may give rise to a drop in battery capacity per unit volume in the battery module. Therefore, the battery module of the present form allows increasing the effective utilization of the volume (volume efficiency) of the battery module as a whole.

In another preferred implementation of the battery module disclosed herein, the positive electrode terminal and the negative electrode terminal are each led out in different directions from two opposing sides of the exterior body, and the pressure regulation member has two liquid storage sections, wherein the two liquid storage sections are respectively formed at regions overlapping the positive electrode terminal and the negative electrode terminal in the stacking direction. In a battery module having such a configuration, control of the restraining pressure on the stack by the pressure regulation member can be accomplished quickly, and it becomes possible to secure satisfactorily the volume efficiency the battery module as a whole, in a battery module configured in the form of a stack of unit cells of a type where positive and negative electrode terminals are led out in respective separate directions.

DETAILED DESCRIPTION OF THE INVENTION

Figure 1:
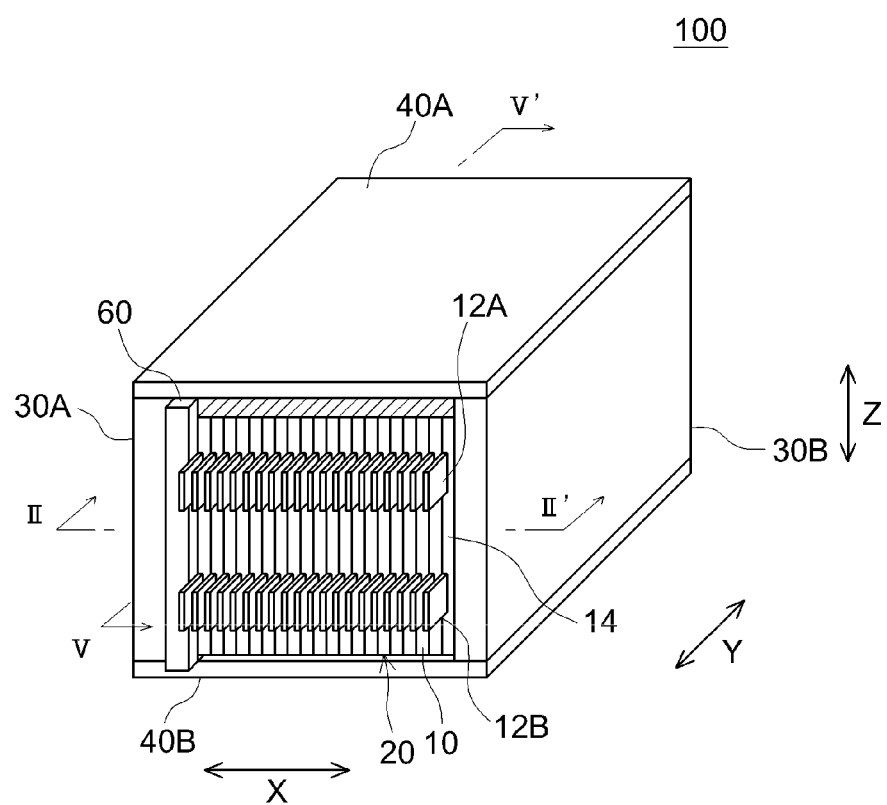
FIG. 1 is a perspective-view diagram illustrating schematically the structure of a battery module according to an embodiment.

Preferred embodiments of the present invention will be explained next with reference to accompanying drawings as appropriate. Any features other than the matter specifically set forth in the present specification and that may be necessary for carrying out the present invention can be regarded as instances of design matter, for a person skilled in the art, based on known techniques in the relevant technical field. The invention can be realized on the basis of the disclosure of the present specification and common technical knowledge in the relevant technical field. In the drawings below, members and portions that elicit identical effects are denoted with identical reference numerals, and a recurrent explanation thereof will be omitted or simplified. The dimensional relationships (length, width, thickness and so forth) in the figures do not necessarily reflect actual dimensional relationships. The figures are merely illustrative in nature, and unless otherwise stated are not meant to limit the present invention any way.

The art disclosed herein can be used for various sealed-type batteries in which the interior of a case is shut off from the external environment by a battery case. Typically, the art is used for various batteries in which a battery case shuts off flow of gases, liquids and solids between the interior and the exterior of the case. In the explanation below, the configuration of a sealed-type battery in which the art of the present invention can be used will be explained first, in a simple manner by way of an example of a lithium ion secondary battery. The sealed-type battery pertaining to the use of the present invention is not meant to be limited to lithium ion secondary batteries.

Figure 2:
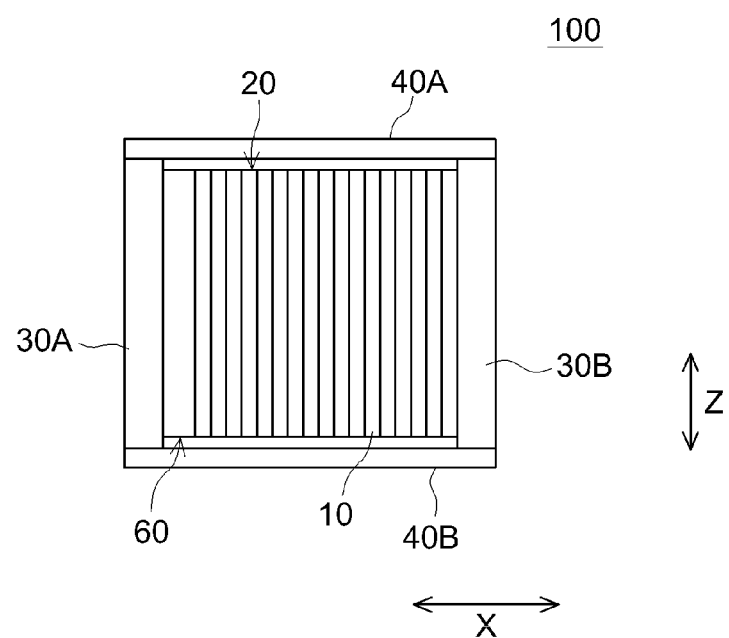
FIG. 2 is a cross-sectional diagram of FIG. 1 as viewed from arrows II-II'.

FIG. 1 is a perspective-view diagram illustrating schematically the structure of a battery module 100 according to an embodiment. FIG. 2 is a schematic diagram illustrating schematically a cross-section of FIG. 1 as viewed from arrows II-II'. As illustrated in FIG. 1 and FIG. 2, the battery module 100 is provided with a stack 20 having a plurality of unit cells 10, a pair of end plates 30A, 30B, a pair of side plates 40A, 40B, and a pressure regulation member 60.

The stack 20 is configured through stacking and arrangement of the plurality of unit cells 10 (preferably chargeable/dischargeable unit cells 10) in a predetermined stacking direction (arrow X direction in FIG. 1). Although not illustrated in the figures, members other than the unit cells 10 (for instance cooling plates) may be interposed between the unit cells 10. For instance metal-made plates for uniformly transmitting pressure from the pressure regulation member 60 to mutually opposing surfaces (hereafter "stacking surfaces"), in the stacking direction X of the unit cells 10 that make up the stack 20, may be interposed between the unit cells 10 and the below-described pressure regulation member 60.

Unit Cells

The unit cells 10 are suitably all-solid-state batteries, and more suitably all-solid-state lithium secondary batteries or lithium-sulfur secondary batteries. All-solid-state batteries are typically provided with a positive electrode, a negative electrode and a solid electrolyte. In a case where the unit cells 10 are all-solid-state batteries, the stacking directions of the positive electrode, the negative electrode and the solid electrolyte are the same as the stacking direction X of the stack 20. The unit cells 10 may be nonaqueous electrolyte secondary batteries. Nonaqueous electrolyte secondary batteries are typically provided with a positive electrode, a negative electrode, a separator and a nonaqueous electrolyte solution. In a case where the unit cells 10 are nonaqueous electrolyte secondary batteries, the stacking directions of the positive electrode, the negative electrode, and the separator are the same as the stacking direction X of the stack 20. In the battery module 100 of one embodiment disclosed herein a restraining load is applied perpendicularly to electrode surfaces within the unit cells 10.

In a case where all-solid-state batteries are used as the unit cells 10, the edges of stacking surfaces, being the surfaces of the unit cells 10 in a direction (i.e. in-plane direction of the YZ plane in FIG. 1) perpendicular to the stacking direction X of the stack 20 tend to expand/shrink to a greater extent than the central portion, during charging/discharge of the battery. The art disclosed herein allows suitably regulating the restraining pressure over the entire stacking surface of the unit cells 10 including the edges, and accordingly the present invention can be meaningfully used in unit cells 10 that are all-solid-state batteries.

The unit cells 10 may be fuel cells or secondary batteries such as nickel-hydride batteries. In the present specification, the term "secondary battery" denotes a general electric storage device that can be charged and discharged repeatedly, and encompasses so-called storage batteries and electric storage elements such as electrical double layer capacitors.

The unit cells 10 are each provided with an exterior body 14 that accommodates therein a power generation element in the form of the above-described electrode body having the positive electrode and negative electrode, an electrolyte and so forth, and with a positive electrode terminal 12A and a negative electrode terminal 12B that are led out from the exterior body 14. The positive electrode terminal 12A and the negative electrode terminal 12B are electrically connected to the electrode body. In an example illustrated in FIG. 1, the positive electrode terminal 12A and the negative electrode terminal 12B are led out in the same direction, from a same side of the exterior body 14.

The positive electrode terminal 12A and the negative electrode terminal 12B of the unit cells 10 may be led out individually from two mutually opposing sides of the exterior body 14 (see FIG. 6 described below).

The material used in the positive electrode of the unit cells 10 in a case where these are all-solid-state batteries is not particularly limited, and there can be used materials that are utilized in positive electrodes of conventional all-solid-state batteries. For instance a lamellar, olivine-type or spinel-type compound can be used as the positive electrode active material in the positive electrode. Specific examples include for instance lithium cobaltate ($LiCoO_2$); lithium nickelate ($LiNiO_2$); lithium manganate ($LiMnO_2$); lithium nickel manganese cobaltate ($LiNi_{1-y-z}Co_yMn_zO_2$, for instance $LiNi_{1/3}Co_{1/3}Mn_{1/3}O_2$); lithium nickel cobaltate ($LiNi_{1-x}Co_xO_2$); lithium nickel manganate ($LiNi_{1-x}Mn_xO_2$); lithium manganate ($LiMn_2O_4$); lithium manganate compounds ($Li_{1+x}M_yMn_{2-x-y}O_4$; M=Al, Mg, Fe, Cr, Co, Ni or Zn); lithium metal phosphates ($LiMPO_4$, M=Fe, Mn, Co or Ni); lithium metal fluorophosphates ($Li_2MPO_4F$, M=Fe, Mn, Co or Ni); lithium metal phosphates ($Li_2MP_2O_7$, M=Fe, Mn, Co or Ni); and lithium titanate ($Li_xTiO_y$). Alternatively, the positive electrode active material may contain sulfur (S), or be sulfur.

The art disclosed herein allows regulating suitably the restraining pressure that is applied in stacking direction X of the stack 20 even upon expansion/shrinkage of the unit cells 10 during charging/discharge of the battery. Accordingly, the use of the art pertaining to the present invention is particularly meaningful in unit cells 10 that utilize, as a positive electrode material, sulfur (S) having the tendency to expand/shrink significantly during charging/discharge.

The material used in the negative electrode of the unit cells 10 in a case where these are all-solid-state batteries is not particularly limited, and there can be used materials that are utilized in negative electrodes of conventional all-solid-state batteries. For instance a metal or a carbon material can be used as the negative electrode active material in the negative electrode. Examples of the metal include for instance Li, Sn, Si, Al, In and Sb as well as combinations and alloys of the foregoing. Examples of the carbon materials include for instance carbon materials having a graphite structure (layered structure) at least in part. Specific examples include natural and artificial graphite, soft carbon, hard carbon, low-temperature fired carbon and combinations of the foregoing.

The art disclosed herein allows regulating suitably the restraining pressure that is applied in the stacking direction X of the stack 20, even upon expansion/shrinkage of the unit cells 10 during charging/discharge of the battery. Accordingly, the use of the art according to the present invention is particularly meaningful in unit cells 10 in which a metal such a Sn or Si or an alloy being a combination of the foregoing, having the tendency to expand/shrink significantly during charging/discharge, is used as the negative electrode material.

In a case where the unit cells 10 are all-solid-state batteries, a material that is utilized in solid electrolytes of conventional all-solid-state batteries can be used also herein, without particular limitations, as the solid electrolyte contained in the unit cells 10. For instance inorganic solid electrolytes such as sulfides and oxides can be used as the solid electrolyte. Sulfide solid electrolytes can be preferably used among the foregoing. The solid electrolyte may be crystalline, amorphous, or a glass ceramic. Examples of sulfide-based solid electrolytes include for instance amorphous ones such as $Li_2S$—$SiS_2$-based, $Li_2S$—$SiS_2$—LiI-based and $Li_2S$—$SiS_2$—$Li_3PO_4$-based solid electrolytes, crystalline ones such as $Li_{10}GeP_2S_{12}$, and glass ceramics such as $Li_7P_3S_{11}$ and $Li_{3.25}P_{0.95}S_4$. Examples of oxide-based solid electrolytes include for instance $La_{0.51}Li_{0.34}TiO_{2.94}$, $Li_{1.3}Al_{0.3}Ti_{1.7}(PO_4)_3$ and $Li_7La_3Zr_2O_{12}$.

The exterior body 14 is preferably made up of a material that is thin, lightweight, highly flexible, melts easily for instance through thermal welding or ultrasonic welding, and is excellent in airtightness and water impermeability. The exterior body 14 may for instance be made up of a laminate film having a three-layer structure in which a metal layer is disposed between two polymer resin layers. The metal layer may for instance be configured out of a metal foil such as aluminum, stainless steel, nickel or copper. The polymer resin layer may for instance be configured out of a thermoplastic resin film, for example a polyolefin such as polyethylene or polypropylene, or ethylene vinyl acetate. Unit cells 10 such as the one illustrated in the figures, in which the exterior body 14 has a flat thin plate-like shape made up of such a laminate film, tend to exhibit significant expansion/shrinkage during charging/discharge, and hence the art of the present invention can be suitably used in those unit cells 10.

End Plates

The pair of end plates 30A, 30B is disposed at both ends of the stack 20 in the stacking direction X. In the present embodiment, the end plate 30A is disposed at a first end of the stack 20 in the stacking direction X, via the pressure regulation member 60. The end plate 30B is disposed at a second end of the stack 20 in the stacking direction X. Material and shapes capable of withstanding the restraining load acting on the stack 20 are used in the end plates 30A, 30B. The end plates 30A, 30B may be made of a metal or a resin, and may for instance be made of carbon steel. The end plates 30A, 30B have a plate-like shape.

Side Plates

The stack 20 is disposed between a pair of side plates 40A, 40B. As illustrated in FIG. 2, the side plates 40A, 40B are disposed spaced from the stack 20. The side plate 40A and the side plate 40B oppose each other across the stack 20. The side plates 40A, 40B connect the pair of end plates 30A, 30B. Specifically the side plate 40A connects a first end of the end plate 30A in the direction of arrow Z in FIG. 1 to a first end of the end plate 30B in the direction of arrow Z in FIG. 1. The side plate 40B connects a second end of the end plate 30A in the direction of arrow Z in FIG. 1 to a second end of the end plate 30B in the direction of arrow Z in FIG. 1. The side plates 40A, 40B may be formed of the same material as that of the end plates 30A, 30B, or may be formed of a different material.

The side plates 40A, 40B and the end plates 30A, 30B may be connected by a fastening member such as bolts. Alternatively, the side plates 40A, 40B and the end plates 30A, 30B may be connected through strong joining, for instance by welding. In a case where the side plates 40A, 40B and the end plates 30A, 30B are joined by welding, a metal is preferably used as the material of the end plates 30A, 30B and of the side plates 40A, 40B.

Pressure Regulation Member

In the embodiment illustrated in FIG. 1 and FIG. 2, the pressure regulation member 60 is disposed between the end plate 30A and one end of the stack 20 in the stacking direction X. The pressure regulation member 60 can regulate the pressure (restraining pressure) acting in the stacking direction X of the stack 20. In such a configuration the pressure regulation member 60 is disposed only at one of the ends of the stack 20 in the stacking direction X. The configuration of the battery module 100 is thus simple, and accordingly the battery module 100 can be made readily more compact.

Figure 3:
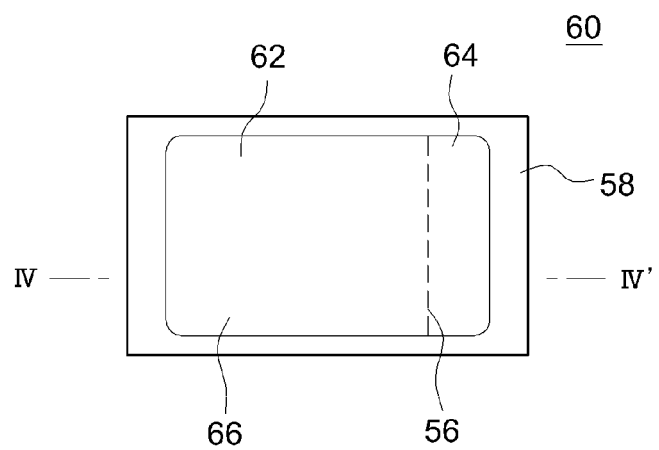
FIG. 3 is a plan-view diagram illustrating schematically a pressure regulation member according to an embodiment.
Figure 4:
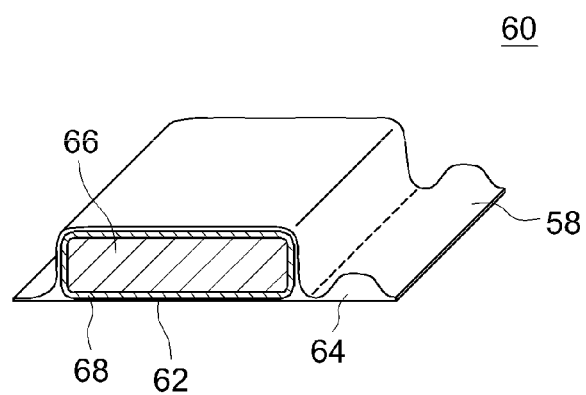
FIG. 4 is a perspective-view diagram including a cross-section, along line IV-IV', of the pressure regulation member illustrated in FIG. 3.

FIG. 3 is a plan-view diagram illustrating schematically the pressure regulation member 60 according to an embodiment. FIG. 4 is a schematic perspective-view diagram of the pressure regulation member 60 including a cross-section of FIG. 3 along line VI-VI'. The pressure regulation member 60 is provided with an exterior film 58 formed in the shape of a bag, and with a liquid holding section 62 and a liquid storage section 64 that are formed inside the bag-shaped exterior film 58. A boundary 56 between the liquid holding section 62 and the liquid storage section 64 is formed so as to enable reversible movement of a liquid, while isolating the liquid holding section 62 and the liquid storage section 64. For instance two exterior films 58, top and bottom, positioned at the boundary 56 of the bag-shaped exterior films 58, are heat-welded in the form of a dotted line (i.e. in the form of a broken line having appropriate gaps); as a result, the liquid can reversibly move between the liquid holding section 62 and the liquid storage section 64, and there can be formed the boundary 56 that hinders movement of a below-described liquid holding body 66 towards the liquid storage section 64.

The exterior films 58 are preferably made up of a material that is thin, lightweight, highly flexible, melts easily for instance through thermal welding or ultrasonic welding, and is excellent in airtightness and water impermeability. The exterior films 58 may for instance be made up of a laminate film having a three-layer structure in which a metal layer is disposed between two polymer resin layers. The metal layer may for instance be configured out of a metal foil such as aluminum, stainless steel, nickel or copper, and is preferably made up of an aluminum foil. The resin layer may for instance be configured out of a thermoplastic resin film, for example a polyolefin such as polyethylene or polypropylene, or ethylene vinyl acetate, with polyethylene and polypropylene being preferred among the foregoing.

The liquid holding body 66 is disposed in the liquid holding section 62. The liquid holding body 66 is made up of a material capable of holding a liquid, and reversibly releasing and absorbing the liquid. A space that allows storing moving liquid when released from the liquid holding body 66 is formed in the liquid storage section 64.

In such a configuration, when external pressure exerted on liquid holding body 66 increases, the liquid is released from the liquid holding body 66, and moves to the liquid storage section 64, through the boundary 56, whereupon there decreases the thickness of the site of the pressure regulation member 60 at which the liquid holding body 66 is disposed. When the external pressure exerted on the liquid holding body 66 decreases, conversely, the liquid is absorbed by the liquid holding body 66, and as a result the liquid from inside liquid storage section 64 flows through the boundary 56 towards the liquid holding body 66, whereupon there increases the thickness of the site of the pressure regulation member 60 at which the liquid holding body 66 is disposed. Thus pressure from outside can be buffered through changes in the thickness of the pressure regulation member 60 in response to external pressure.

The liquid holding body 66 is preferably made up of a material capable of holding a large amount of liquid and capable of reversibly releasing and absorbing the liquid depending on the pressure exerted from outside. A preferred liquid holding body 66 is, for instance, a water-absorbing polymer, a polymer porous body, and a fiber aggregate. Concretely, a preferred liquid holding body 66 is, for instance, a water-absorbing polymer such as sodium polyacrylate, polyvinyl alcohol, polyethylene glycol, polyacrylamide or poly-N-isopropylamide; a polymer porous body made up of a polymer such as a polyolefin such as polyethylene or polypropylene, polyurethane, polystyrene, a phenolic resin, polyvinyl chloride, a urea resin, a silicone resin, a polyimide or a melamine resin; or a fiber aggregate such as a nonwoven fabric. Among the foregoing, a water-absorbing polymer or a polymer porous body can be preferably used as the liquid holding body 66.

The above-described water-absorbing polymers can be used, as the liquid holding body 66, singly or in combinations of two or more types. Alternatively, the above-described polymer porous bodies can be used singly or in combinations of two or more types, as the liquid holding body 66. Alternatively, two or more types selected from among a water-absorbing polymer, a polymer porous body and a fiber aggregate can be used as the liquid holding body 66.

A temperature-responsive water-absorbing polymer is preferably used as the material that makes up the liquid holding body 66. The term temperature-responsive water-absorbing polymer (also referred to as temperature-sensitive porous polymer gel) denotes a polymer that reversibly expands/shrinks in response to temperature stimuli, typically by releasing a liquid at a temperature higher than the transition temperature specific to each polymer, and absorbing the liquid at a temperature lower than the transition temperature.

Examples of temperature-responsive water-absorbing polymers that can be preferably used in the liquid holding body 66 disclosed herein include poly-N-isopropylamide. By using poly-N-isopropylamide as the liquid holding body 66, the restraining pressure exerted on the stack 20 can be increased through thickening of the pressure regulation member 60 derived from absorption of a liquid by the liquid holding body 66, when the temperature of the battery module 100 is lower than about 32° C., which is the lower critical solution temperature (LCST) of poly-N-isopropyl-amide, while when the temperature of the battery module 100 is higher than about 32° C., the restraining pressure exerted on the stack 20 can be lowered through a decrease in the thickness of the pressure regulation member 60, derived from release of the liquid (for instance water) by the liquid holding body 66. Temperature responsiveness can be regulated through formation of various poly-N-isopropyl-amide derivatives having different temperature responsiveness, by copolymerizing N-isopropylamide with appropriate monomers. For instance, the LCST can be shifted to a lower temperature by copolymerizing N-isopropylamide with a hydrophobic monomer (butyl methacrylate or the like). Conversely, the LCST can be shifted to a higher temperature by copolymerizing N-isopropylamide with a hydrophilic monomer (N,N-dimethylaminopropyl acrylamide or the like).

By appropriately using thus various water-absorbing polymer materials having different temperature responsiveness, it becomes possible to suitably regulate the restraining pressure in accordance with a desired temperature in a battery module 100 that utilizes unit cells 10 having the tendency to expand with rises in temperature during charging/discharge.

Alternatively, a porous body that deforms elastically on account of the restraining pressure acting in the stacking direction X of the stack 20 can be preferably used as the polymer porous body. In a case where the polymer porous body is used as a liquid holding body 66, the liquid can be suitably held in the pores of the liquid holding body 66, and can be reversibly released and absorbed through deformation of the liquid holding body 66 on account of pressure exerted from outside. The pressure regulation member 60 having the liquid holding body 66 allows as a result controlling suitably the restraining pressure that is exerted on the stack 20. The liquid holding body 66 including the polymer porous body that deforms elastically on account of the restraining pressure allows suitably controlling the restraining pressure that is applied to the stack 20 also by an elastic force generated through that elastic deformation.

The liquid holding body 66 having the configuration described above, a liquid can be held inside the liquid holding section 62 in a state in which the liquid holding body 66 is accommodated in a container 68 into/from which the liquid can flow reversibly. Accommodating the liquid holding body 66 in the container 68 allows bringing out the function of releasing/absorbing a liquid by the pressure regulation member 60 (liquid holding section 62) over long periods of time, without collapse of the shape of the liquid holding body 66. The container 68 preferably deforms easily in response to deformation of the liquid holding body 66 through release/absorption of the liquid.

The container 68 can be for instance a container formed to a bag shape having a plurality of through-holes. The container 68 may be for instance a bag-shaped container formed out of a reticular (mesh-like) sheet. A metal or resin is preferred as the material of the container 68. A resin can be preferably used as the material of the container 68, from the viewpoint of corrosion resistance and being lightweight. For instance nylon, polypropylene or polyethylene terephthalate can be preferably used as the material of the container 68.

A hydrophilic solvent is preferably used as the liquid contained in the pressure regulation member 60, from the viewpoint of being suitably held in the liquid holding body 66. For instance water or a water-containing aqueous solvent is preferred herein. The solvent may contain a salt. Examples of the salt include inorganic salts and organic salts. Examples of inorganic salts include for instance normal salts, acidic salts and basic salts. The liquid holding ability of the liquid holding body 66 can be controlled by a liquid containing such a salt. In a case where a salt-containing aqueous solution is used as the liquid in the pressure regulation member 60, the concentration of the solution is not particularly limited.

Figure 5:
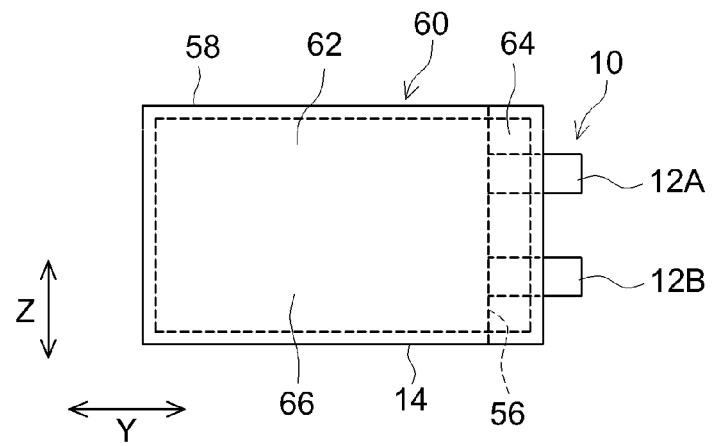
FIG. 5 is a cross-sectional diagram of FIG. 1 as viewed from arrows V-V'.

FIG. 5 is a diagram (schematic diagram) of FIG. 1 as viewed from V-V'. As illustrated in FIG. 5, the pressure regulation member 60 is disposed so that the liquid holding section 62 overlaps the region at which the stack 20 (or unit cells 10 that make up the stack 20) is disposed. That is, the liquid holding section 62 is disposed at the position at which there is applied the restraining pressure exerted in the stacking direction X of the stack 20. Further, the pressure regulation member 60 is disposed in such a manner that the liquid storage section 64 overlaps an outward side of the region at which the stack 20 (or the unit cells 10 that make up the stack 20) is disposed. That is, the liquid storage section 64 is disposed at a position at which there is not applied the restraining pressure exerted in the stacking direction X of the stack 20. Preferably, the liquid storage section 64 is formed in the direction along which the positive electrode terminal 124 and the negative electrode terminal 12B are led out from the exterior body 14. In other words, the liquid storage section 64 is formed at a region overlapping the positive and negative electrode terminals 12A, 12B in the stacking direction (that is, when viewed from the stacking direction). In such a configuration, the above restraining pressure is not applied to the liquid storage section 64, and accordingly the liquid can be suitably stored, and it is not necessary to further provide a space for arranging the liquid storage section 64, separately from the space in which there are disposed the positive and negative electrode terminals 12A, 12B that are led out from the exterior body 14 of the unit cells 10, as illustrated in FIG. 5. Accordingly, it becomes possible to increase the volume efficiency of the battery module as a whole through an increase in battery capacity per unit volume.

In a case where the unit cells 10 that make up the stack 20 expand/shrink in the stacking direction X there changes the magnitude of the pressure applied to the site of the pressure regulation member 60 at which the liquid holding section 62 is disposed. The thickness of the pressure regulation member 60 changes through release or absorption of the liquid by the liquid holding section 62 in response to changes in pressure from outside, and as a result it becomes possible to suitably control the restraining pressure that is exerted in the stacking direction X of the stack 20.

Figure 6:
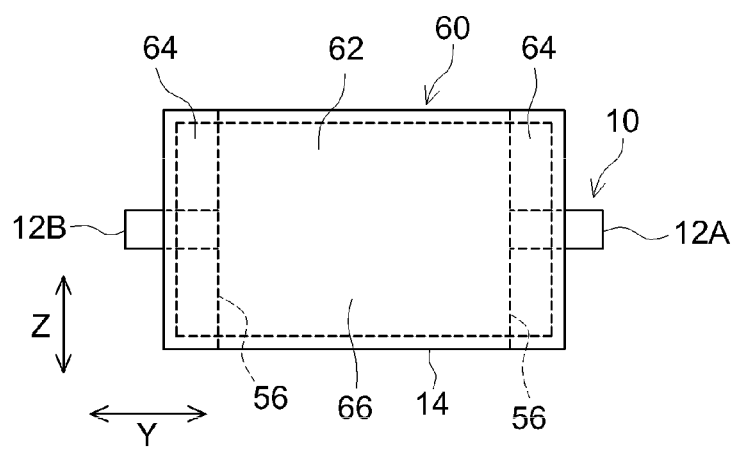
FIG. 6 is diagram of a battery module according to another embodiment, viewed from line V-V' of FIG. 1.

FIG. 6 is diagram of the battery module 100 according to another embodiment, viewed from line V-V' of FIG. 1. The positive electrode terminal 12A and the negative electrode terminal 12B of the unit cells 10 according to the present embodiment are led out from two opposing sides of the exterior body 14. The pressure regulation member 60 according to the present embodiment has two liquid storage sections 64, and the two liquid storage sections 64 are respectively formed at regions overlapping the positive electrode terminal 12A and the negative electrode terminal 12B, in the stacking direction, in the respective directions along which the positive electrode terminal 12A and the negative electrode terminal 12B are led out from the exterior body 14. As illustrated in FIG. 6, the liquid holding section 62 is disposed so as to overlap the region at which the stack 20 (or unit cells 10) is disposed, when viewed from the stacking direction X of the stack 20. In such a configuration the movement of the liquid from the liquid holding section 62 towards the two liquid storage sections 64 is complete in a shorter time, and accordingly the restraining pressure of the stack 20 can be controlled more effectively by the pressure regulation member 60.

Figure 7:
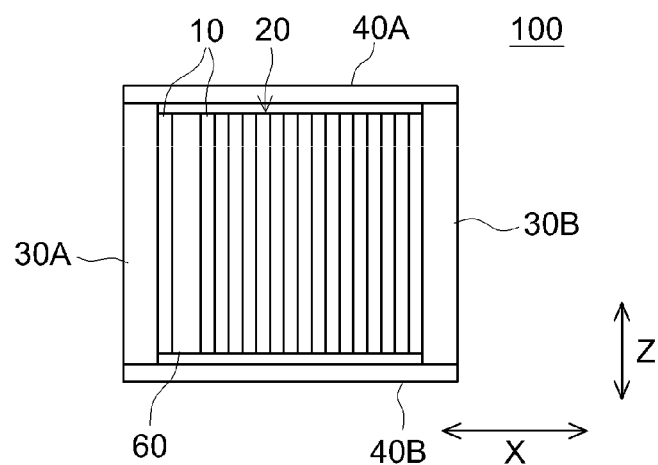
FIG. 7 is a cross-sectional diagram illustrating schematically a battery module according to another embodiment.

FIG. 7 is a cross-sectional diagram illustrating schematically a battery module 100 according to another embodiment. As illustrated in FIG. 7, the pressure regulation member 60 may be disposed at one site from among the gaps between the stacked unit cells 10. The battery module 100 can be readily made more compact by adopting such a configuration.

Figure 8:
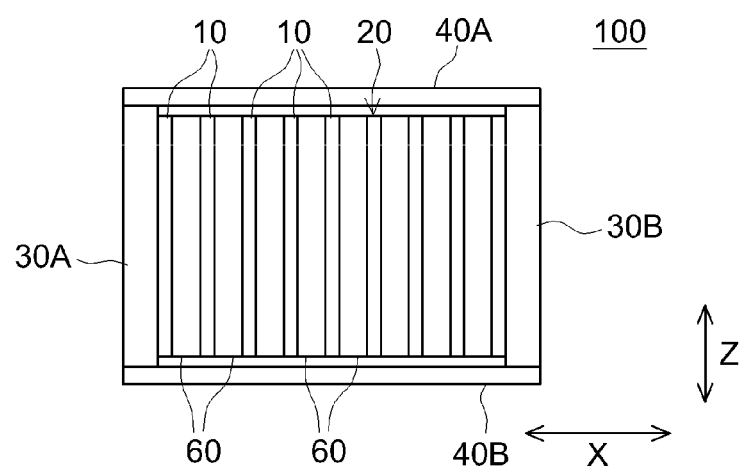
FIG. 8 is a cross-sectional diagram illustrating schematically a battery module according to another embodiment.

FIG. 8 is a cross-sectional diagram illustrating schematically a battery module 100 according to another embodiment. As illustrated in FIG. 8, the pressure regulation member 60 may be disposed at a plurality of sites in gaps between stacked unit cells 10. For instance the pressure regulation member 60 may be disposed in all the gaps between unit cells 10. Further, the pressure regulation member 60 may be disposed in all the gaps between individual unit cells 10 and also at the two ends of the unit cells 10 in the stacking direction X. In such a configuration the regulation function of the restraining pressure on the stacking direction X of the stack 20, elicited by the pressure regulation member 60, is brought out more suitably. Accordingly, this embodiment can be suitably used in a case where unit cells 10 are used that have the tendency to expand/shrink significantly as a result of charging and discharge.

The pressure regulation member 60 may be disposed at a central portion of the stack 20 in the stacking direction X. Such a configuration allows realizing a battery module that strikes a good balance between compactness of the battery module and control of the restraining pressure. The central portion of the stack 20 in the stacking direction X is a site at which temperature readily becomes highest during use of the battery; accordingly, the restraining pressure that is exerted on the stack 20 can be controlled with good precision in response to changes in the temperature of the battery module 100 when the pressure regulation member 60 having the temperature-responsive water-absorbing polymer is disposed at the above central portion.

Concrete examples of the present invention have been explained in detail above, but these are merely exemplary in nature, and are not meant to limit the scope of the claims in any way. The features set forth in the claims can accommodate various modifications and alterations of the concrete examples illustrated above.

What is claimed is:

1. A battery module, comprising: a stack in which two or more unit cells are stacked; and
   a pressure regulation member, which is disposed at least at one site from among a gap between the stacked unit cells, and a first end and a second end in the stacking direction, and which regulates a restraining pressure exerted in the stacking direction of the stack,
   wherein the unit cell is provided with an exterior body, an electrode body accommodated in the exterior body, and a positive electrode terminal and a negative electrode terminal electrically connected to the electrode body and led out from the exterior body;
   the pressure regulation member is provided with a liquid holding section and a liquid storage section;
   the liquid holding section
     is formed at a position at which the restraining pressure is applied, and
     includes a liquid and a liquid holding body capable of holding the liquid,
     wherein the liquid holding body is capable of reversibly releasing and absorbing the liquid;
   the liquid holding section
     is formed at a position at which the restraining pressure is not applied, and
     has a space capable of storing the liquid; and
   a boundary between the liquid holding section and the liquid storage section is formed so that the liquid can move reversibly therethrough while movement of the liquid holding body towards the liquid storage section is hindered.

2. The battery module of claim 1, wherein the liquid holding body contains a water-absorbing polymer having temperature responsiveness.

3. The battery module of claim 1, wherein the liquid holding body contains a polymer porous body that deforms elastically on account of the restraining pressure.

4. The battery module of claim 1, wherein the liquid holding body is held in the liquid holding section in a state in which the liquid holding body is accommodated in a container into and out of which the liquid can reversibly flow.

5. The battery module of claim 1, wherein two or more liquid storage sections are formed at positions in mutually different directions with respect to the liquid holding section.

6. The battery module of claim 1, wherein the liquid storage section is formed at a region overlapping the positive electrode terminal and/or the negative electrode terminal in the stacking direction.

7. The battery module of claim 1,
   wherein the positive electrode terminal and the negative electrode terminal are each led out in different directions from two opposing sides of the exterior body;
   the pressure regulation member has two liquid storage sections; and
   the two liquid storage sections are respectively formed at regions overlapping the positive electrode terminal and the negative electrode terminal in the stacking direction.

* * * * *